(12) United States Patent
Huang (10) Patent No.: US 8,857,471 B2
(45) Date of Patent: Oct. 14, 2014

(54) CONTROL STRUCTURE OF WALL-MOUNTED FAUCET

(75) Inventor: Li-Chen Huang, Changhua (TW)

(73) Assignee: Alexander Yeh Industry Co. Ltd., Changhua (TW)

( * ) Notice: Subject to any disclaimer, the term of this patent is extended or adjusted under 35 U.S.C. 154(b) by 400 days.

(21) Appl. No.: 13/304,367

(22) Filed: Nov. 24, 2011

(65) Prior Publication Data

US 2013/0134346 A1 May 30, 2013

(51) Int. Cl.
*F16K 21/00* (2006.01)

(52) U.S. Cl.
USPC ........... 137/801; 251/175; 251/321; 251/339; 4/678

(58) Field of Classification Search
CPC ........................... E03C 2201/30; E03C 1/0404
USPC ................. 4/675, 678; 137/119.01, 467, 801; 251/175, 319–321, 326, 339; 239/505, 239/587.1
See application file for complete search history.

(56) References Cited

U.S. PATENT DOCUMENTS

| 3,387,816 | A | * | 6/1968 | Holycross | 251/175 |
| 6,070,280 | A | * | 6/2000 | Ko | 4/678 |
| 2009/0205128 | A1 | * | 8/2009 | Jones et al. | 4/678 |
| 2012/0211108 | A1 | * | 8/2012 | Yeh | 137/801 |
| 2012/0234419 | A1 | * | 9/2012 | Hsieh | 137/801 |

* cited by examiner

*Primary Examiner* — Marina Tietjen
(74) *Attorney, Agent, or Firm* — Che-Yang Chen; Law Office of Michael Chen (57) ABSTRACT

A control structure of a wall-mounted faucet includes a water outlet and a control device, wherein the control device has a control stick, a valve block, a sealing unit and a resilient unit, wherein the control stick is disposed through a through hole of the water outlet, and the valve block has two clamping ribs protrudingly located at front side of the valve block, and the clamping ribs clamp the control stick. A connecting surface is located on top of the clamping ribs, and the resilient unit covers the control stick, wherein both ends of the resilient unit are against the stopping surface of the water outlet and the connecting surface of the valve block. So, the control stick is pushed by the resilient unit to drive the valve block to escape the valve of the water outlet to avoid the water unexpectedly spraying out from the showerhead.

5 Claims, 9 Drawing Sheets

CONTROL STRUCTURE OF WALL-MOUNTED FAUCET

FIELD OF THE INVENTION

The present invention relates to a control structure of a wall-mounted faucet, and particularly to the control structure having a resilient unit against a stopping surface of a water outlet and a connecting surface of a valve block. A control stick is pushed by the resilient unit to drive the valve block to escape a valve of the water outlet to avoid the water unexpectedly spraying out from a showerhead when the user wants to use it next time, and to achieve the goal of auto-switching.

BACKGROUND OF THE INVENTION

Figure 9:
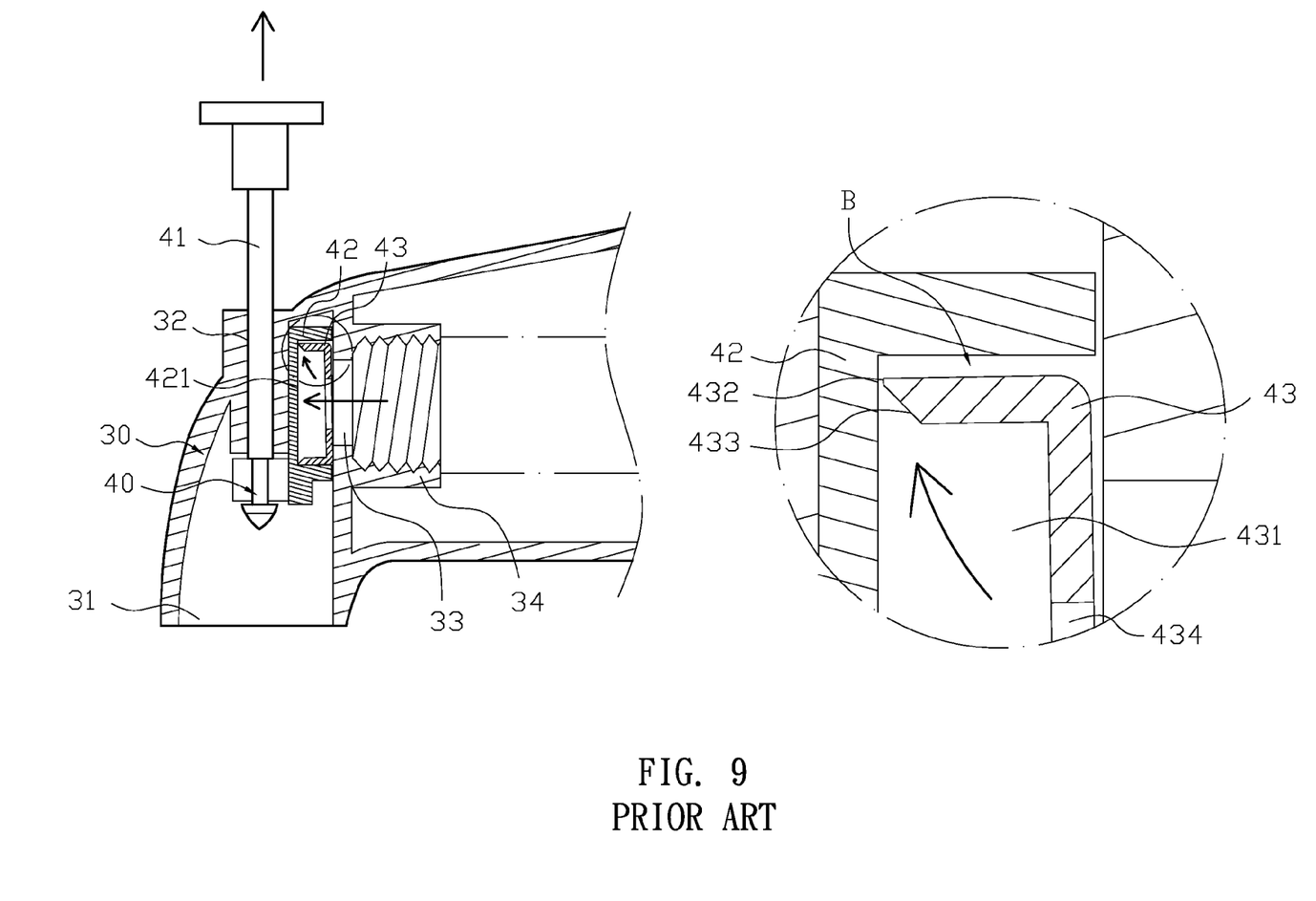
FIG. 9 illustrates a schematic view of sectional and partial enlarging view of a prior art.

A conventional faucet structure is shown in FIG. 9, including a water outlet head (30) and a switch unit (40), wherein the water outlet head (30) has a water output end (31) that has a through hole (32) on top and a valve opening (33) near the water outlet end (31), and the valve opening (33) extends to have a connecting section (34). The switch unit (40) has a control rod (41), a valve piece (42) and a sealing element (43). The control rod (41) pokes through the through hole (32) of the water outlet head (30), and the valve piece (42) is at the bottom section. The valve piece (42) tightly touches the valve opening (33) of the water outlet head (30), and recessedly forms a position slot (421) on the side. The position slot (421) is provided for the sealing element (43) to engage with, and a recessed cut (431) is formed on one side of the sealing element (43), and the recessed cut (431) forms an attaching end (432) that is disposed against the opening surface of the position slot (421) of the valve piece (42). Also, a slanting end (433) is formed inside the attaching end (432) and a connecting hole (434) is formed and through the opening surface of the recessed cut (431). When in use, the connecting section (34) of the water outlet head (30) is connected to the water supply and when the user lifts the control rod (41), the valve piece (42) close the valve opening (33), so that the water can be directed to the showerhead. When the water supply is off, the pressure in the water outlet head (30) is reduced and the valve piece (42) detaches from the valve opening (33) of the water outlet head (30) due to gravity, so that the position of the water outlet head (30) can be automatically switched to avoid unexpected water output when using it next time. The conventional structure is disadvantageous because (a) when the water supply is off, the valve piece (42) is affected by residual water pressure inside the water outlet head (30), so the automatic switch is not complete and water may come out from the showerhead unexpectedly; (b) when valve piece (42) switches, the sealing element (43) can be easily affected by the edge of the valve opening (33) to increase the gap (B) between the periphery of the sealing element (43) and the position slot. Also, when water flows into the sealing element (43) from the connecting hole (434) to hold the recessed cut (431) of the sealing element (43) open, the attaching end (432) of the recessed cut (431) has a slanting end (433) inside so the attaching end (432) can be pushed and lifted by water flow to leak from the gap (B). Therefore, there remains a need for a new and improved control structure of the faucet to overcome abovementioned disadvantages.

SUMMARY OF THE INVENTION

The present invention wants to solve the problems: (a) when the water supply is off, the valve piece is affected by residual water pressure inside the water outlet head, so the automatic switch is not complete and water may come out from the showerhead unexpectedly; and (b) when valve piece switches, the sealing element can be easily affected by the edge of the valve opening to increase the gap between the periphery of the sealing element and the position slot. Also, when water flows into the sealing element from the connecting hole to hold the recessed cut of the sealing element open, the attaching end of the recessed cut has a slanting end inside so the attaching end can be pushed and lifted by water flow to leak from the gap.

To solve abovementioned problems, the present invention provides a control structure of a wall-mounted faucet includes a water outlet and a control device, wherein the water outlet has an outlet at a front end, and a connecting pole is formed protrudingly on top of the outlet. The connecting pole has a through hole that has a stopping surface at lower edge of the through hole, and a valve is located near the outlet. The control device has a control stick, a valve block, a sealing unit and a resilient unit. The control stick is disposed through the through hole of the water outlet, and the valve block has two clamping ribs protrudingly located at a front side of the valve block, and the clamping ribs clamp the control stick, and a connecting surface is located on top of the clamping ribs. Also, a positioning slot is recessedly formed at a rear end of the valve block, and the sealing unit is disposed in the positioning slot of the valve block. A recessed opening is formed on one side of the sealing unit, and the recessed opening has an attaching edge attaching to an opening surface of the positioning slot of the valve block. Also, a slanting edge is formed outside the attaching edge and a connecting hole is formed and through the recessed opening. The resilient unit covers the control stick, and both ends thereof are used to be against the stopping surface of the water outlet and the connecting surface of the valve block to obtain an improved control structure of the wall-mounted faucet.

Comparing with the conventional faucet, the present invention is advantageous because (a) the present invention provides a control structure of the wall-mounted faucet, wherein both ends of the resilient unit of the control device are against the stopping surface of the water outlet and the connecting surface of the valve block, and the control stick is pushed by the resilient unit to drive the valve block to escape the valve of the water outlet to avoid the water unexpectedly spraying out from the showerhead when the user wants to use it next time, and to achieve the goal of auto-switching; and (b) the present invention provides a control structure of the wall-mounted faucet, wherein the sealing unit of the valve block has the slanting edge outside and when the sealing unit is compressed by the edge of the valve, the slanting edge is deformed to block an inner portion of the positioning slot, so that the attaching edge can exactly seal gap between the sealing unit and the inner wall of the positioning slot to avoid water leaking into the sealing unit and achieve the goal of sealing and stopping water instantaneously.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
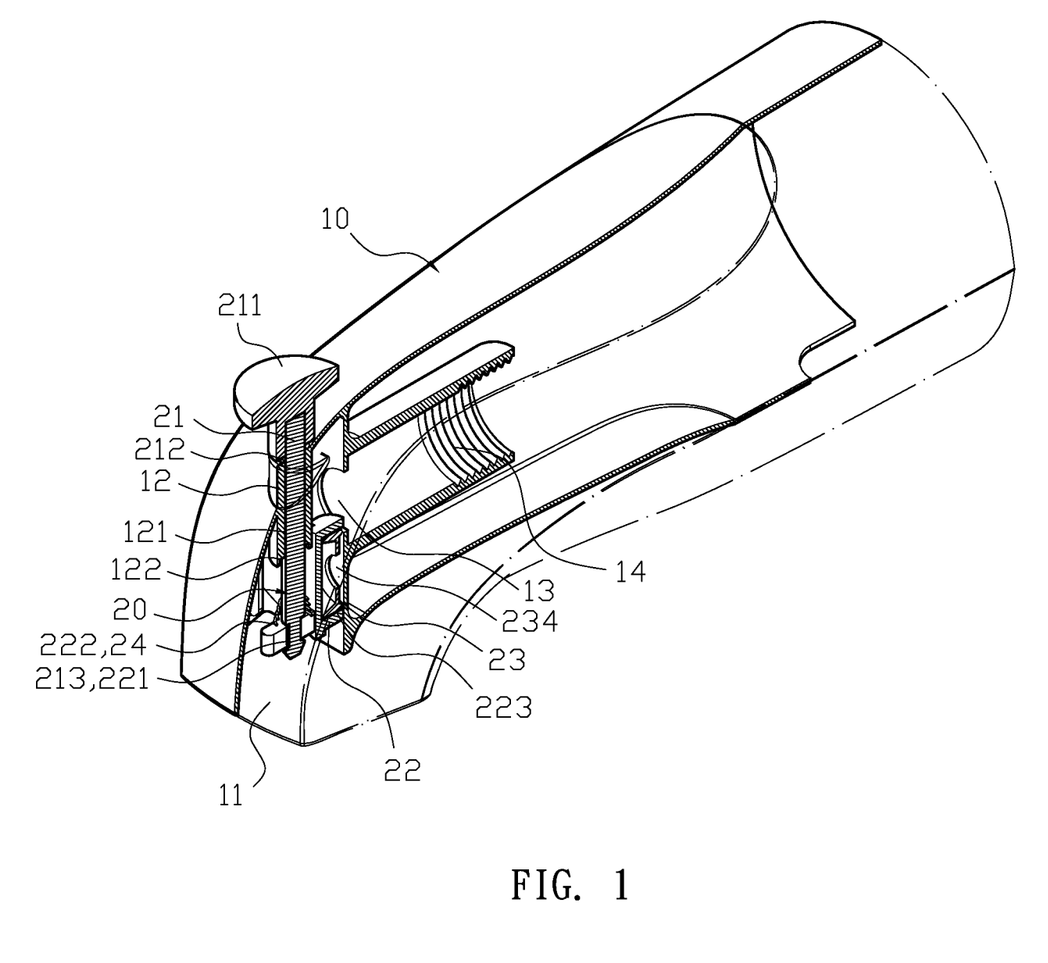
FIG. 1 illustrates a three-dimensional assembled view in the present invention.
Figure 2:
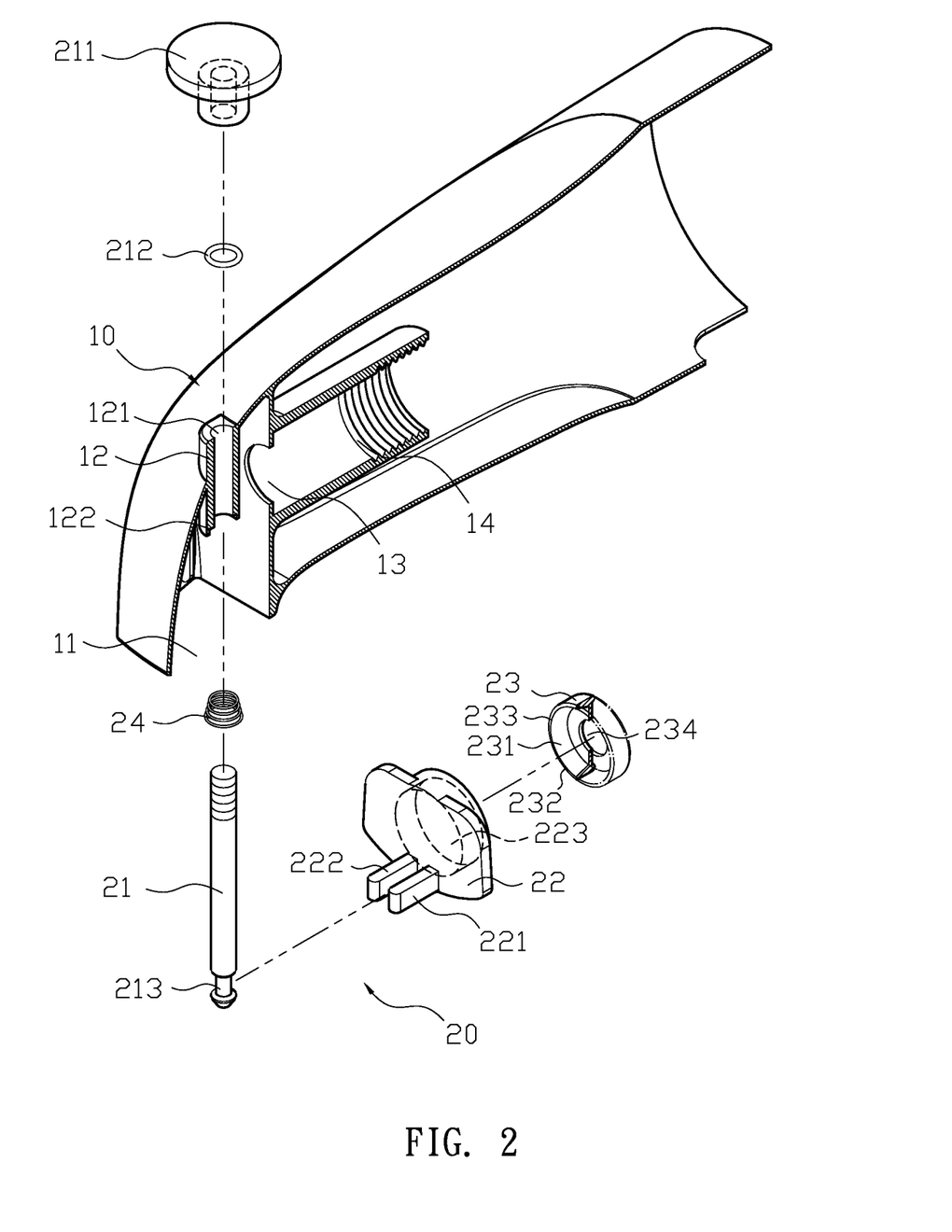
FIG. 2 illustrates a three-dimensional exploded view in the present invention.

In order to further understand the goal, characteristics and effect of the present invention, a number of embodiments along with the drawings are illustrated as following:

Referring to FIGS. 1 and 2, a control structure of a wall-mounted faucet includes a water outlet (10) and a control device (20), wherein the water outlet (10) has an outlet (11) at a front end, and a connecting pole (12) is formed protrudingly on top of the outlet (11). The connecting pole (12) has a through hole (121) that has a stopping surface (122) at lower edge of the through hole (121). A valve (13) is located near the outlet (11), and a connecting tube (14) is extended from the periphery of the valve (13) to a rear axis thereof. The control device (20) has a control stick (21), a valve block (22), a sealing unit (23) and a resilient unit (24). The control stick (21) is disposed through the through hole (121) of the water outlet (10), and a pulling head (211) is located on top of the control stick (21), and a sealing circle (212) is disposed at the edge of the through hole (121) of the water outlet (10). A wedging slot (213) is recessedly formed close to a bottom end of the control stick (21). The valve block (22) has two clamping ribs (221) protrudingly located at a front side of the valve block (22), and the clamping ribs (221) clamp the wedging slot (213) of the control stick (21), and a connecting surface (222) is located on top of the clamping ribs (221). Also, a positioning slot (223) is recessedly formed at a rear end of the valve block (22), and the sealing unit (23) is disposed in the positioning slot (223) of the valve block (22), and attaches to the valve (13) of the water outlet (10). An enlarging recessed opening (231) is formed on one side of the sealing unit (23), and the recessed opening (231) has an attaching edge (232) attaching to an opening surface of the positioning slot (223) of the valve block (22). Also, a slanting edge (233) is formed outside the attaching edge (232). A connecting hole (234) is formed and through the recessed opening (231), and the resilient unit (24) covers the control stick (21), and both ends thereof are used to be against the stopping surface (122) of the water outlet (10) and the connecting surface (222) of the valve block (22).

Referring to FIGS. 1 and 2 again for the structure of the present invention, the sealing unit (23) is disposed in the positioning slot (223) of the valve block (22) via the recessed opening (231), so that the attaching edge (232) of the sealing unit (23) is against the opening surface of the positioning slot (223), and the clamping ribs (221) of the valve block (22) clamp the wedging slot (213) of the control stick (21). Also, the resilient unit (24) covers the control stick (21), so one end of the resilient unit (24) is against the connecting surface (222) of the valve block (22). And a top end of the control stick (21) pokes through the water outlet (10) to connect the pulling head (211) to complete the assembly process.

Figure 3:
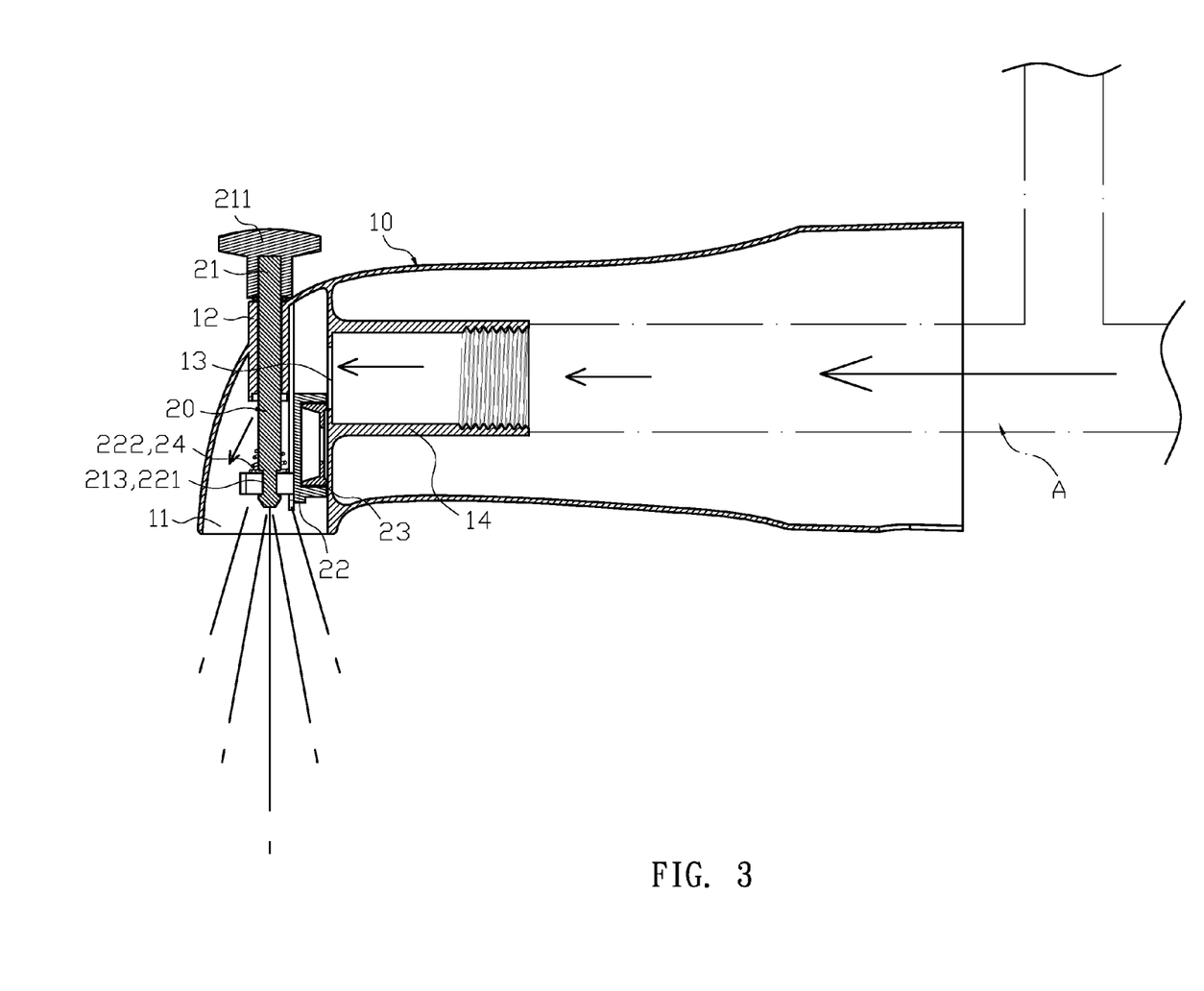
FIG. 3 illustrates a sectional view in the present invention.
Figure 4:
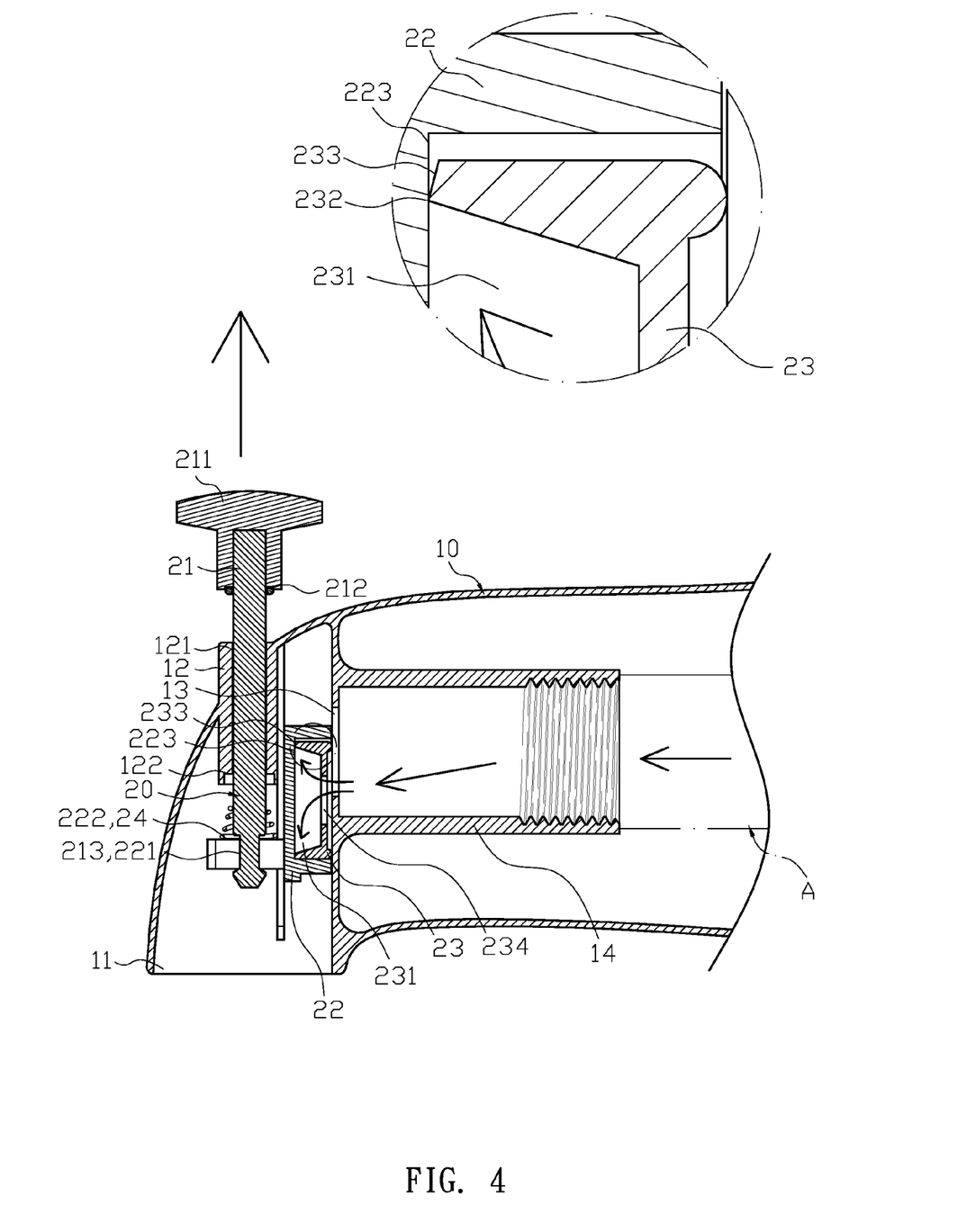
FIG. 4 illustrates a partial enlarging view when the present invention is in use.
Figure 5:
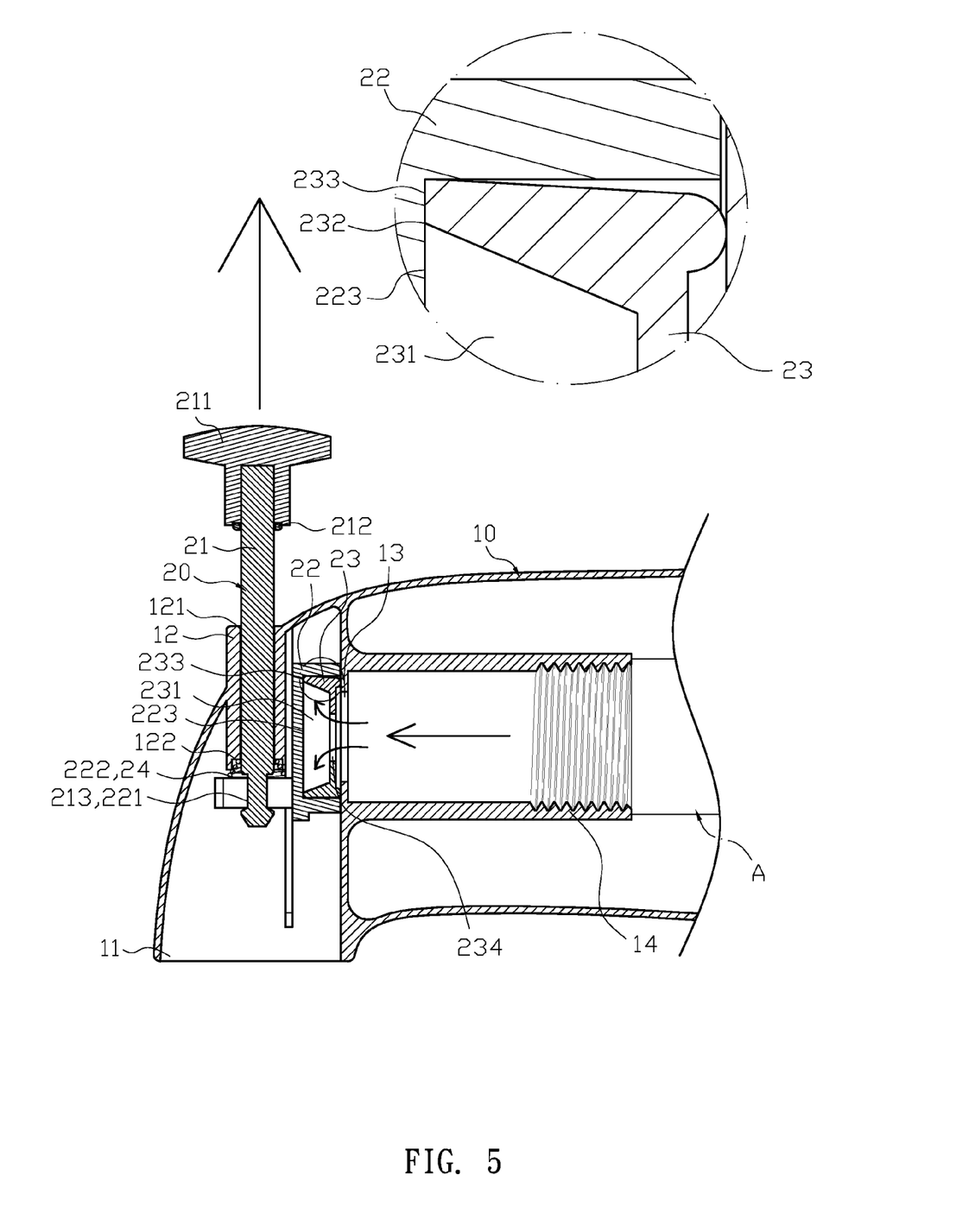
FIG. 5 illustrates a partial enlarging view of the slanting edge of the sealing unit that is deformed to block the inner portion of the positioning slot in the present invention.
Figure 6:
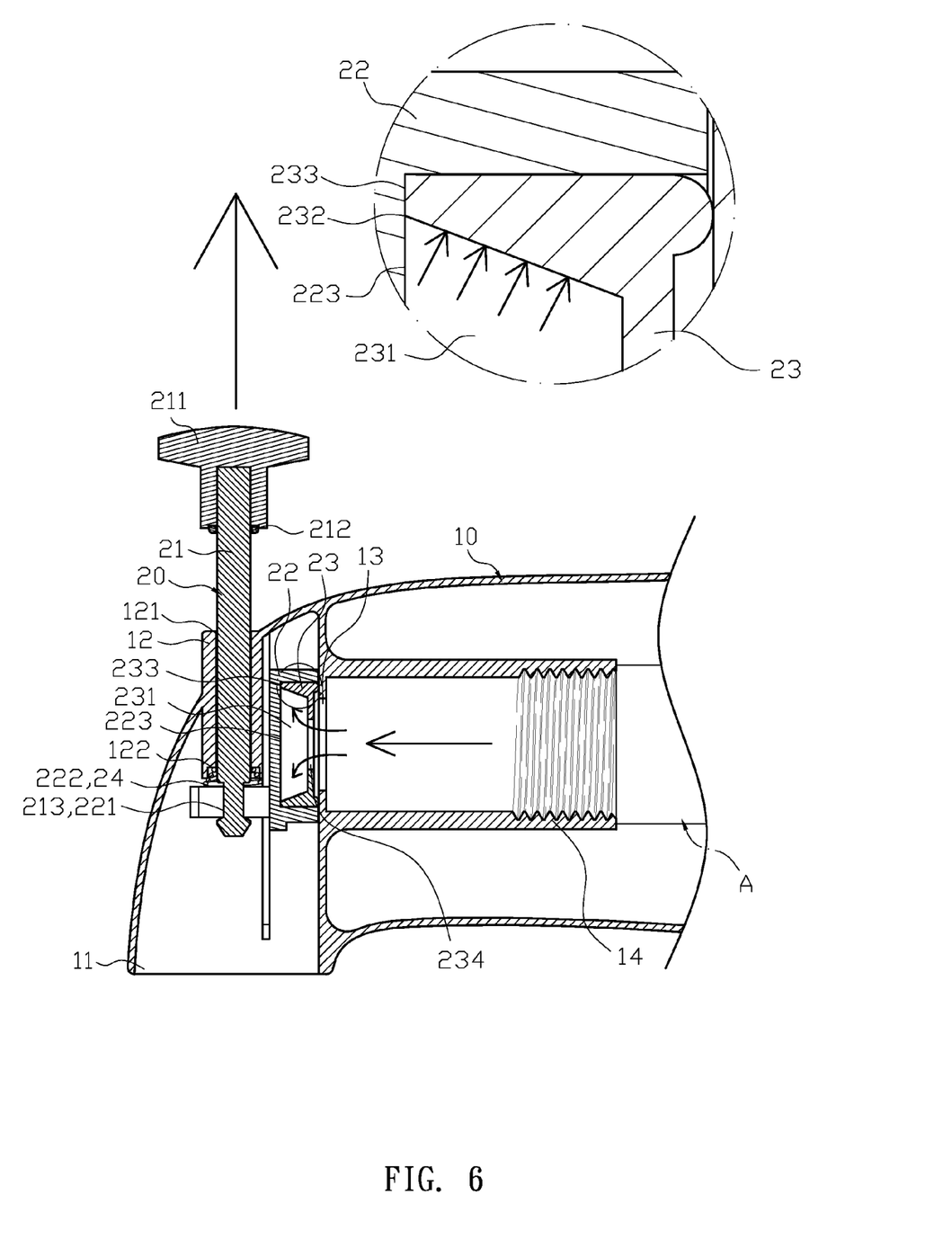
FIG. 6 illustrates a partial enlarging view of the recessed opening of the sealing unit to be held open by water pressure in the present invention.
Figure 7:
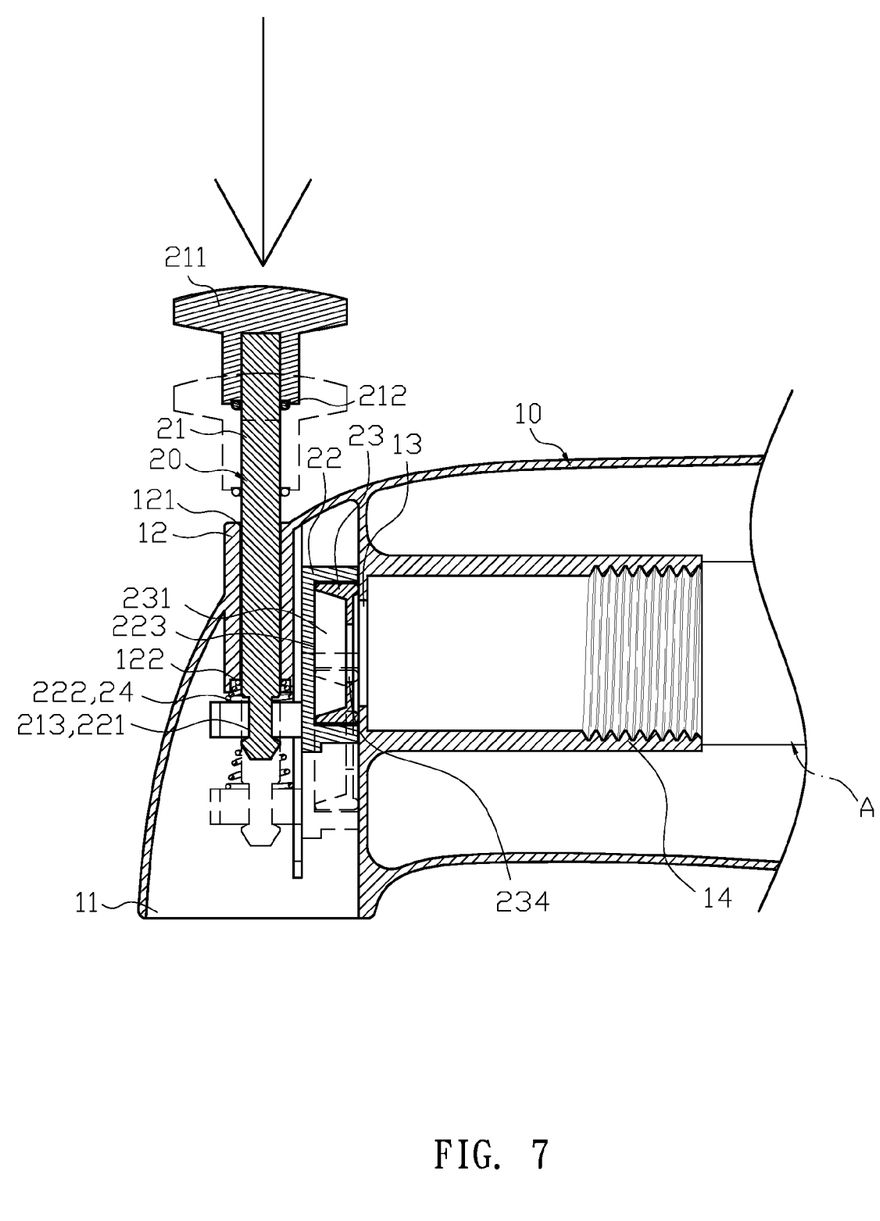
FIG. 7 illustrates a first schematic view of the valve block that automatically falls down in the present invention.
Figure 8:
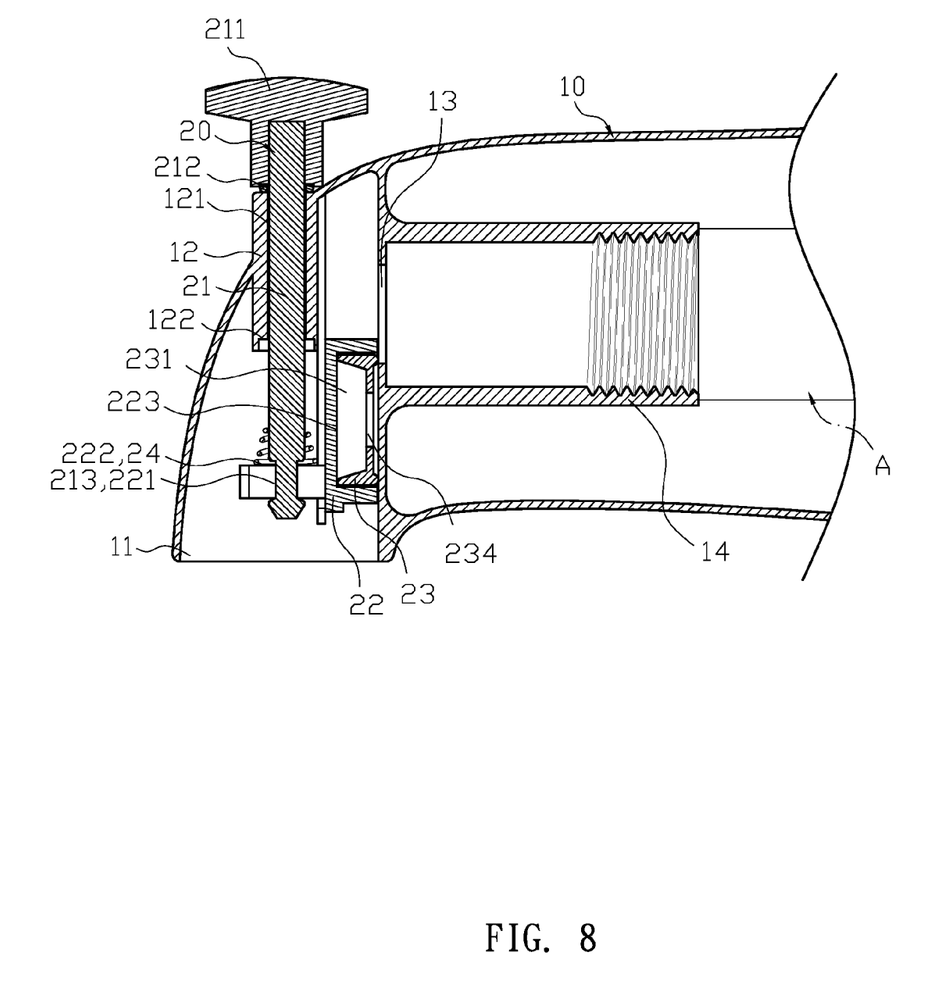
FIG. 8 illustrates a second schematic view of the valve block that automatically falls down in the present invention.

Referring to FIGS. 3 and 4 for the present invention in use, the connecting tube (14) of the water outlet (10) is connected to a water supply (A) on a wall surface, and the water supply (A) is connected to a showerhead (not shown). When the water supply (A) provides water, the water flows out from the connecting tube (14) through the valve (13) and the outlet (11), and if a user wants to use the showerhead, he/she can lift the pulling head (211) of the control stick (21) in the control device (20) to drive the valve block (22) upwards to close the valve (13) of the water outlet (10) to compress the resilient unit (24). Meanwhile, since the sealing unit (23) of the valve block (22) has the slanting edge (233) outside, when the sealing unit (23) is compressed by the edge of the valve (13), the slanting edge (233) is deformed to block an inner portion of the positioning slot (223), so that the attaching edge (232) can exactly seal gap between the sealing unit (23) and the inner wall of the positioning slot (223) (see FIG. 5 as well) to avoid water leaking into the sealing unit (23) and achieve the goal of sealing and stopping water. The water pressure can therefore quickly hold the attaching edge (232) open and attach to inner wall of the positioning slot (223) of the valve block (22), so that when the valve block (22) is switched, it can stop the water at the same time to achieve the goal of stopping water instantaneously (see FIG. 6 as well). Also, since the recessed opening (231) of the sealing unit (23) is enlarging, when water flows into the sealing unit (23), it can evenly hold the recessed opening (231) open, so that the periphery of the sealing unit (231) can further tightly touch the inner wall of the positioning slot (223) to enhance water stopping effect of the valve block (22). Referring to FIG. 7, when the water is not provided from the water supply (A), the pressure of incoming water reduces and some residue pressure is still in the connecting tube (14) of the water outlet (10). At this time, since both ends of the resilient unit (24) of the control device (20) are against the stopping surface (122) of the water outlet (10) and the connecting surface (222) of the valve block (22), the control stick (21) is pushed by the resilient unit (24) to drive the valve block (22) to escape the valve (13) of the water outlet (10) (see FIG. 8 as well) to avoid the water unexpectedly spraying out from the showerhead when the user wants to use it next time, and to achieve the goal of auto-switching.

According to the embodiments disclosed above, it is advantageous that (a) since the sealing unit (23) of the valve block (22) has the slanting edge (233) outside, when the sealing unit (23) is compressed by the edge of the valve (13), the slanting edge (233) is deformed to block an inner portion of the positioning slot (223), so that the attaching edge (232) can exactly seal gap between the sealing unit (23) and the inner wall of the positioning slot (223) to avoid water leaking into the sealing unit (23) and achieve the goal of sealing and stopping water. The water pressure can therefore quickly hold the attaching edge (232) open and attach to inner wall of the positioning slot (223) of the valve block (22), so that when the valve block (22) is switched, it can stop the water at the same time to achieve the goal of stopping water instantaneously; (b) since the recessed opening (231) of the sealing unit (23) is enlarging, when water flows into the sealing unit (23), it can evenly hold the recessed opening (231) open, so that the periphery of the sealing unit (231) can further tightly touch the inner wall of the positioning slot (223) to enhance water stopping effect of the valve block (22); and (c) since both ends of the resilient unit (24) of the control device (20) are against the stopping surface (122) of the water outlet (10) and the connecting surface (222) of the valve block (22), the control stick (21) is pushed by the resilient unit (24) to drive the valve block (22) to escape the valve (13) of the water outlet (10) to avoid the water unexpectedly spraying out from the showerhead when the user wants to use it next time, and to achieve the goal of auto-switching.

Having described the invention by the description and illustrations above, it should be understood that these are exemplary of the invention and are not to be considered as limiting. Accordingly, the invention is not to be considered as limited by the foregoing description, but includes any equivalent.

What is claimed is:

1. A control structure of a wall-mounted faucet comprising:
a water outlet having an outlet at a front end, a connecting pole formed protrudingly on top of the outlet, and a through-hole on the connecting pole that has a stopping surface at a lower edge of the through-hole, and a valve located near the outlet; and
a control device having a control stick, a valve block, a sealing unit and a resilient unit, wherein the control stick is disposed through the through-hole of the water outlet, and the valve block has two clamping ribs protrudingly located at a front side of the valve block, and the clamping ribs clamp the control stick, and a connecting surface is located on top of the clamping ribs, wherein a positioning slot is recessedly formed at a rear end of the valve block, and the sealing unit is disposed in the positioning slot of the valve block, wherein a recessed opening is formed on one side of the sealing unit, and the recessed opening has an attaching edge attaching to an opening surface of the positioning slot of the valve block, and a connecting hole is formed through the recessed opening, wherein the resilient unit covers the control stick, and one end of the resilient unit is used against the stopping surface of the water outlet and the other end of the resilient unit is used against the connecting surface of the valve block, wherein a slanting edge extends radially outward from the attaching edge to an outer substantially cylindrical surface of the sealing unit, such that when the sealing unit is compressed by an edge of the valve, the slanting edge is deformed to block an inner portion of the positioning slot, so that the attaching edge seals a gap between the sealing unit and the inner wall of the positioning slot to avoid water leaking into the sealing unit.

2. The control structure of the wall-mounted faucet of claim 1, wherein a connecting tube is formed and extended toward a rear end from a periphery of the valve of the water outlet.

3. The control structure of the wall-mounted faucet of claim 1, wherein a pulling head is located on top of the control stick, and a sealing circle is disposed at the edge of the through hole of the water outlet.

4. The control structure of the wall-mounted faucet of claim 1, wherein a wedging slot is recessedly formed close to a bottom end of the control stick, and the wedging slot is provided for the clamping ribs of the valve block to clamp.

5. The control structure of the wall-mounted faucet of claim 1, wherein the recessed opening of the sealing unit enlarges in diameter extending towards the attaching edge.

\* \* \* \* \*